UNITED STATES PATENT OFFICE.

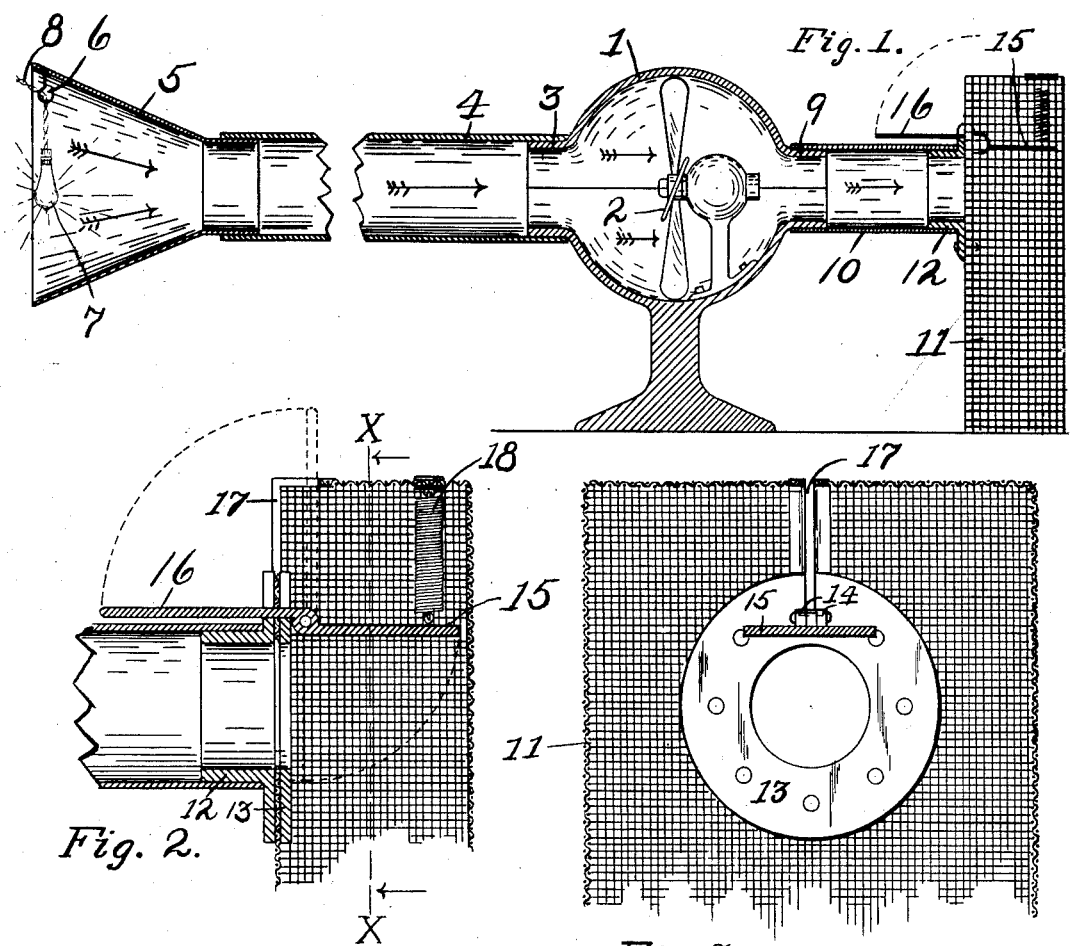

JOHN NAULT, OF CHICAGO HEIGHTS, ILLINOIS.

DEVICE FOR CATCHING FLIES AND OTHER INSECTS.

959,155. Specification of Letters Patent. Patented May 24, 1910.

Application filed June 12, 1909. Serial No. 501,781.

*To all whom it may concern:*

Be it known that I, JOHN NAULT, a citizen of the United States, residing at Chicago Heights, county of Cook, and State of Illinois, have invented a certain new and useful Device for Catching Flies and other Insects, of which the following is a specification.

My invention relates to a device for forcibly catching flies and other insects by means of a draft of air, and the invention consists in the combination and arrangement of parts hereinafter described and claimed.

In the drawings, Figure 1 is a section of the device embodying my invention, Fig. 2 is an enlarged partial section through the trap for catching the flies or other insects, and Fig. 3 is a section on line *x x* of Fig. 2.

In a suitable casing 1 is mounted an electric fan 2 adapted when operated to produce a draft of air through the casing in the direction of the arrows on Fig. 1. At one side the casing 1 is provided with a tubular flange 3 over which fits a flexible tube 4 provided at its outer end with a flaring intake 5. The tube 4 may be of rubber, canvas or other flexible material. At its mouth the intake 5 is provided with a hook 6 from which an electric light 7 may be suspended on a cable 8 for use at night. Opposite to flange 3 the casing 1 is provided with another tubular flange 9 over which fits a tube 10 communicating at its other end with a trap 11 of fine wire mesh. The connection between tube 10 and trap 11 is made through a flanged sleeve 12 riveted to the annular plate 13 on the inside of trap 11. Connection between tube 10 and flange 12 is simply a sliding fit so that the trap may be readily detached from the rest of the apparatus when desired. The annular plate 13 is provided with lugs 14 between which is pivoted a gate or door 15 adapted to close the opening into trap 11. Gate 15 carries an arm 16 projecting through a slot 17 in the flange of sleeve 12, plate 13 and in the side and top of trap 11, as shown. A spring 18 secured to the top of trap 11 and to gate 15 normally holds the gate 15 in open position, as indicated in Fig. 2.

In use a draft of air is drawn through tube 4 and projected into trap 11 by means of the fan 2. Tube 4 being flexible the intake 5 may be directed in different directions and to different positions where flies or other insects have accumulated, such as in show-windows or on counters. The draft of air will draw the flies or other insects into tube 4 when they will be projected into trap 15 from which they cannot escape. When it is desired to kill and remove the flies from trap 11 gate 15 is closed by means of handle 16, the trap detached and the flies or other insects killed by immersion in water or otherwise, as desired. Then the dead flies or other insects may be removed through sleeve 12 and the tube replaced for further use. At night the light 7 may be suspended in the mouth of intake 5 which will attract flies or other insects, thus placing them within the influence of the draft passing into tube 4 and resulting in their capture.

While I have illustrated and described the preferred construction for carrying my invention into effect, this may be varied somewhat without departing from the spirit of my invention, I, therefore, do not wish to be limited to the exact construction set forth, but wish to avail myself of such variations and modifications as come within the scope of the appended claims.

Having described my invention what I claim as new and desire to secure by Letters Patent is:

1. In a device of the class described, the combination of a tube; means for drawing a draft of air through the tube; a detachable insect trap at the discharge end of said tube; and a trap door for said trap normally held in open position by a spring, but adapted to be closed when the trap is detached, substantially as described.

2. In a device of the class described, the combination of a suitable casing; an electric fan in said casing and adapted to force a blast of air through the casing; a flexible tube attached to the intake of said casing; a flaring intake for said tube, having an electric light suspended therein; an insect trap consisting of an inclosure of wire netting and detachably secured to the discharge end of the fan casing; and a trap door for said trap, normally held in open position by a spring, but adapted to be closed when the trap is detached, substantially as described.

3. In a device of the class described, the combination of a suitable casing; an electric fan in said casing and adapted to force a blast of air therethrough; an intake tube for said casing; a discharge tube for said casing; an insect trap consisting of an inclosure of wire netting provided with an opening; and a flanged sleeve secured around said opening and adapted to detachably telescope said discharge tube, substantially as described.

4. In a device of the class described, the combination of a suitable casing; an electric fan in said casing and adapted to force a blast of air therethrough; an intake tube for said casing; a discharge tube for said casing; an insect trap consisting of an inclosure of wire netting provided with an opening; a flanged sleeve secured around said opening and adapted to detachably telescope said discharge tube; a trap door adapted to close said opening and provided with an operating handle extending through a slot provided in said inclosure; and a spring for normally holding said trap door in open position, substantially as described.

In testimony whereof I have signed my name to this specification in the presence of two subscribing witnesses.

JOHN NAULT.

Witnesses:
JOSHUA R. H. POTTS,
HELEN F. LILLIS.